United States Patent [19]

Wessel et al.

[11] 4,105,000
[45] Aug. 8, 1978

[54] FUEL INJECTION MECHANISM

[75] Inventors: Wolf Wessel, Oberriexingen; Wolfgang Ripper, Stuttgart, both of Fed. Rep. of Germany

[73] Assignee: Robert Bosch GmbH, Stuttgart, Fed. Rep. of Germany

[21] Appl. No.: 741,641

[22] Filed: Nov. 15, 1976

[30] Foreign Application Priority Data

Feb. 24, 1976 [DE] Fed. Rep. of Germany ....... 2607367

[51] Int. Cl.² ............... F02M 39/00; F02M 11/00
[52] U.S. Cl. ..................... 123/139 AW; 261/44 R
[58] Field of Search ....... 123/32 EJ, 119 R, 139 AW; 261/44 R, 44 A

[56] References Cited

U.S. PATENT DOCUMENTS

| 1,555,489 | 9/1925 | Spencer et al. | 261/44 R |
|---|---|---|---|
| 1,951,262 | 3/1934 | Townsley | 261/44 A |
| 1,981,483 | 11/1934 | Weber | 261/44 R |
| 2,798,705 | 7/1957 | Lawrence, Sr. | 261/44 R |
| 3,880,125 | 4/1975 | Kammerer et al. | 123/139 AW |

Primary Examiner—Charles J. Myhre
Assistant Examiner—R. A. Nelli
Attorney, Agent, or Firm—Edwin E. Greigg

[57] ABSTRACT

A fuel injection system for use with internal combustion engines in which is provided an air aspiration line within which is included a fuel valve for the apportionment of a fuel quantity proportional to the air quantity. The fuel valve extends transversely of the air aspiration line and is arranged to include a plurality of communicating passages about which is positioned a perforated carrier body. A sleeve that includes valve members is also arranged to encircle the carrier body and together therewith adapted to control fuel flow and air flow to said engine.

4 Claims, 4 Drawing Figures

FUEL INJECTION MECHANISM

BACKGROUND OF THE INVENTION

The invention relates to a fuel injection mechanism for mixture compressing, externally ignited internal combustion engines, particularly one provided with an injection location in the air aspiration line, within which are consecutively disposed an airflow measuring element and an arbitrarily manipulatable throttle valve. The airflow measuring element is moved in accordance with the airflow rate and against a restoring force, thereby displacing the movable component of a fuel valve for the apportionment of a fuel quantity proportional to the air quantity, the fuel valve being located within the rotating shaft of the air measuring element.

Fuel injection mechanisms of this kind have the purpose of automatically producing a favorable fuel-air mixture for all of the operational conditions of the internal combustion engine, in order to effect the complete combustion of the fuel, and thereby to avoid or at least to reduce greatly the formation of noxious exhaust gas constituents, in conjunction with the highest possible output of the internal combustion engine, or the least possible fuel consumption. The fuel quantity must therefore be very precisely apportioned in correspondence to the requirements of each given operational condition of the internal combustion engine.

To quarantee the reliable starting and the continuation of the running of the internal combustion engine after starting, it is necessary to supply the engine with a richer fuel-air mixture than that supplied subsequent to the warm-up phase when the internal combustion engine is operationally warm or until that normal operational temperature is reached.

OBJECT AND SUMMARY OF THE INVENTION

It is the object of the present invention to develop a fuel injection mechanism of the familiar, known type, with which, however, an improved accommodation to the requirements of the combustion engine during the warm-up phase is assured.

This objective is achieved, according to the invention, by the fact that an auxiliary fuel valve is actuatable in accordance with the given attitude of the measuring element, and that the fuel apportioned by the auxiliary fuel valve is injected into the air suction line via a temperature dependently controlled pressure regulating valve disposed downstream of the auxiliary fuel valve, together with the fuel quantity apportioned by the apportioning valve, during the warm-up phase of the combustion engine.

An advantageous configuration of the invention consists in the fact that the auxiliary fuel valve is formed by means of an auxiliary control edge of the bearing axle, which auxiliary control edge cooperates with an auxiliary control slit, which is situated in a sleeve rotatable relative to the bearing axle in accordance with the given deflection of the measuring element.

A further advantageous configuration of the invention consists in the fact that the temperature dependently controlled pressure regulating valve is constructed as a flat seated valve having a membrane as its movable valve component. This membrane cooperates with a fixed valve seat in the valve chamber, in which valve chamber the fuel pressure prevalent downstream of the auxiliary fuel valve prevails, and in which valve chamber a pressure spring is disposed which acts upon the membrane and thereby arranged to urge said membrane toward the opened direction of the pressure regulating valve. On the other hand, the membrane is urged toward a closed direction of the pressure regulating valve by the force of a bimetallic spring acting thereagainst.

According to a further advantageous embodiment of the invention, the temperature dependently controlled pressure regulating valve is closed by means of the bimetallic spring subsequent to the completion of the warm-up phase of the internal combustion engine.

The invention will be better understood as well as other objects and advantages thereof become more apparent from the following detailed description of the invention taken in conjunction with the drawing.

DESCRIPTION OF THE PREFERRED EMBODIMENT

Figure 1:
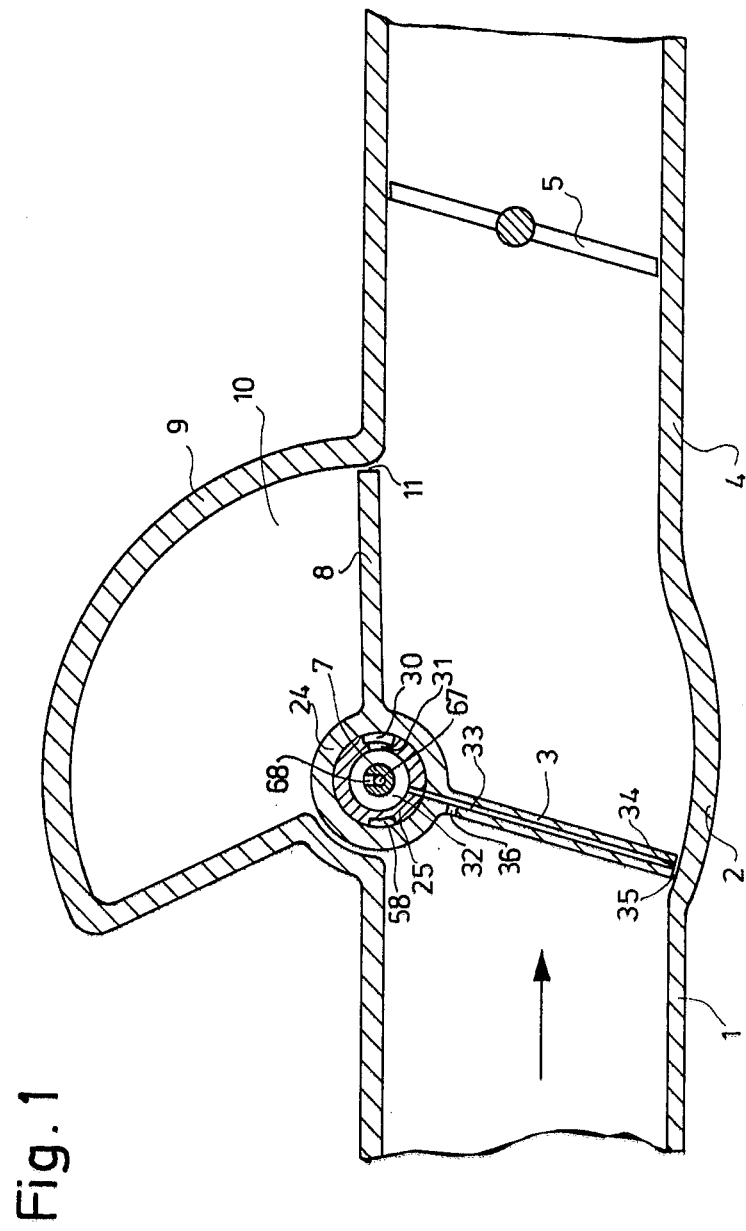
FIG. 1 is a section through a fuel injection mechanism along the line I—I in FIG. 2.

In the fuel injection mechanism represented in FIG. 1, the combustion air flows in the direction of the arrow into an air suction line 1, which is provided with a curved section 2 containing a measuring element constructed as a barrier valve 3, and further flows through a section 4 containing an arbitrarily manipulatable throttle valve 5 and on to one or several cylinders (not shown) of an internal combustion engine. The measuring element constructed as the barrier valve 3 moves within the complementally formed section 2 of the air suction line 1 as a nearly linear function of the air quantity flowing through the air suction line, in which for a constant air pressure prevalent upstream of the measuring element 3, the air pressure prevailing between the measuring element and the throttle valve 5 likewise remains constant. The measuring element 3 is pivotal about a fixed bearing axle 7 disposed transversely relative to the air suction line, and it is provided with a damping valve 8. The damping valve 8 can travel into a damping section 9 of the air suction line during an opening movement of the measuring element 3. The chamber 10 formed by the damping valve 8 and the damping section 9 communicates with the air suction line downstream of the measuring element 3 via a small gap 11 that is provided between the extremity of the damping valve 8 and the opposing wall of the damping section 9. It is a result of the incorporation of the damping valve 8 that the suction tube pressure fluctuations evoked by the suction strokes have practically no influence upon the angular positioning of the measuring element 3.

Figure 2:
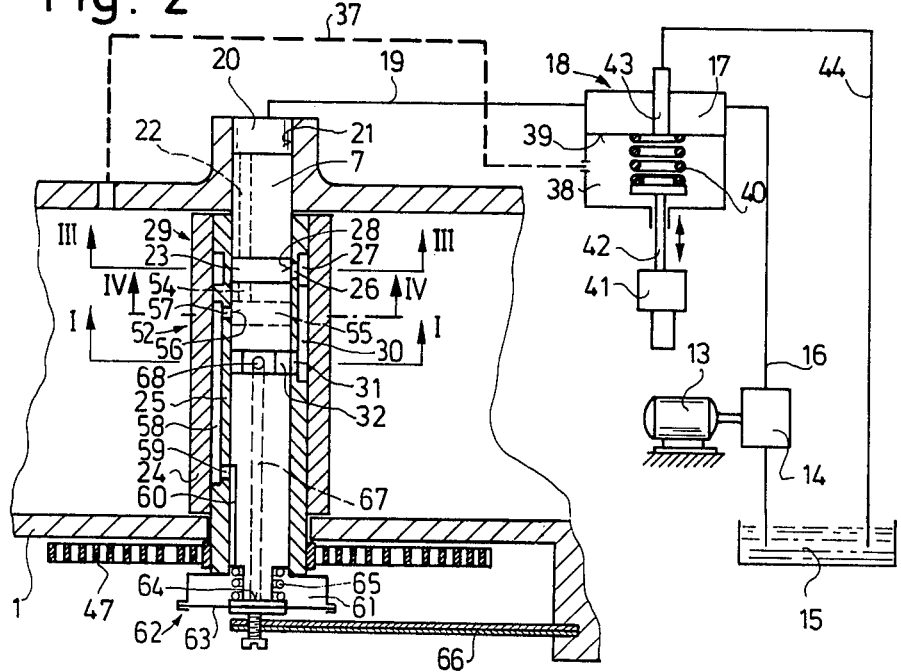
FIG. 2 shows a schematic view of the fuel injection mechanism associated with the valving structure.
Figure 3:
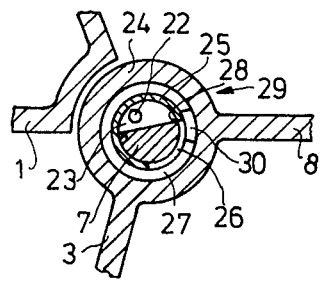
FIG. 3 is a sectional view of the fuel injection mechanism along the line III—III of FIG. 2.
Figure 4:
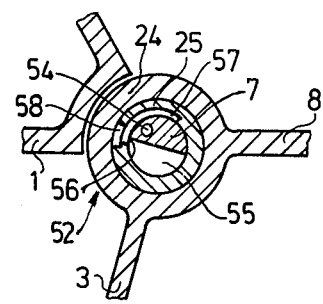
FIG. 4 is a sectional view of the fuel injection mechanism along the line IV—IV of FIG. 2.

As depicted in FIG. 2, the supplying of the fuel takes place by means of a fuel pump 14 driven by an electric motor 13, which fuel pump 14 sucks fuel from a fuel container 15 and delivers the same to a chamber 17 of a differential pressure valve 18 via a line 16. From the chamber 17 the fuel travels to a chamber 20 via a line 19, which chamber 20 is formed by the end face of the bearing axle 7 and the guide boring 21 of the bearing axle 7. The chamber 20 communicates with a notch 23 machined into the bearing axle 7, via a boring 22 depicted in FIG. 2 by dashed lines. The measuring element 3 and the damping valve 8 are integrally disposed upon a carrier body 24, which is firmly attached to a sleeve 25 which is rotatably supported around the bearing axle 7. The sleeve 25 incorporates a control slit 26 which leads to an annular groove 27. The control slit 26 cooperates with a control edge 28 (FIG. 3), which is formed by the boundary surfae of the notch 23 of the bearing axle 7. The control slit 26 is opened more or less according to the given attitude of the measuring element 3 by means of the control edge 28, so that a proportional fuel quantity can be apportioned relative to the air quantity aspirated by the internal combustion engine. The control edge 28 and the control slit 26 cooperate with a sleeve-like apportioning valve 29 disposed about the bearing axle 7 of the measuring element 3. From the annular groove 27, the apportioned fuel reaches in annular groove 32 of the bearing axle 7 via a notch 30 and an opening 31 in the sleeve 25. The annular groove 32 communicates with a line 33 located in the axis of the measuring element 3, which line 33 leads via an injection jet 34 to the gap 35 at the face of the measuring element 3, which gap 35 is exposed to the highest air velocity, between the face of the measuring element 3 and the opposing curved wall of the air suction line 2. The line 33 communicates with the suction tube section 1 upstream of the measuring element 3 via an air opening 36, so that the suction tube pressure prevalent upstream of the measuring element prevails downstream of the fuel apportioning location and acts as a counter pressure. The line 33 can, as not shown here, also communicate with several injection jets 34 disposed in the lower surface of the measuring element 3. An injection slit extending nearly over the entire width of the surface of the measuring element 3 can also serve as the injection jet 34. Furthermore, the injection jet 34 could, although it is not shown here, be supplanted by an injection valve.

The apportionment of the fuel at the sleeve-like apportioning valve 29 takes place at a constant pressure difference. For this reason, a chamber 38 separated from the chamber 17 of the differential pressure valve 18 by a membrane 39 communicates with the suction tube section 1 upstream of the measuring element 3 via an air line 37 represented by a dashed line, so that the same pressure magnitude prevails in the chamber 38 as is provided downstream of the control slit 26. The differential pressure valve 18 is urged toward the closed direction by a spring 40 disposed within the chamber 38. The spring force of the spring 40 can be varied in accordance with known operational characteristics of the internal combustion engine. For example, an electromagnet 41 which acts upon the spring 40 via an actuating pin 42 can serve for this purpose, or else an auxiliary force which is a function of known operational characteristics can act directly against the membrane 39 in parallel with the spring 40. The magnetic force can, for example, be variable in accordance with the signal from an oxygen probe disposed in the exhaust system of the internal combustion engine.

The differential pressure valve 18 is constructed as a flat seated valve, with the membrane 39 comprising the movable valve component, and having a fixed valve seat 43, past which fuel can flow to reach a return flow line 44, which leads to the fuel container 15. The differential pressure valve 18 simultaneously serves as the system pressure valve.

The deflection of the measuring element 3 takes place against the force of a spiral spring 47, one extremity of which is connected to the sleeve 25, while the other extremity is connected to a detent at the air suction line. The initial position of the sleeve-like apportioning valve 29 is variable by means of a rotational movement of the bearing axle 7 relative to the measuring element 3. As depicted in FIG. 1, the line 33 communicates with an air opening 36, which leads into the air suction line 1 upstream of the mesuring element 3.

The application of the suction tube pressure prevalent upstream of the measuring element 3 via the air opening 36, in its function as a counter pressure at the apportioning location, has the further advantages, aside from the advantage of preconditioning the apportioned fuel with the air, that, on the one hand, an open injection jet can be utilized, and, on the other hand, that the regulation of a constant differential pressure at the apportioning location can be simplified.

The enrichment of the fuel-air mixture during the warm-up phase of the internal combustion engine results, according to the invention, from the fact that an auxiliary fuel quantity is apportioned at an auxiliary fuel valve 52 in accordance with the given attitude of the measuring element 3, and that this auxiliary fuel quantity is injected into the air suction line through the injection jet 34 together with the fuel quantity apportioned at the apportioning valve 29, during the warm-up phase of the internal combustion engine, via a temperature dependently controlled pressure regulating valve 62 disposed downstream of the auxiliary fuel valve 52. The auxiliary fuel valve 52 is preferably located within the bearing axle 7. For this purpose, the annular groove 23 of the apportioning valve 29 communicates with an auxiliary notch 55 incorporated into the bearing axle 7, via a boring 54, which auxiliary notch 55 possesses an auxiliary control edge 56 formed by that boundary surface in the bearing axle 7. The auxiliary control edge 56 cooperates with an auxiliary control slit 57 machined into the sleeve 25, which control slit 57 leads into a longitudinal groove 58 of the sleeve 25. The auxiliary control slit 57 is opened more or less, according to the given attitude of the measuring element 3, by means of the auxiliary control edge 56. From the longitudinal groove 58, the auxiliary fuel apportioned at the auxiliary fuel valve 52 reaches a valve chamber 61 of a temperature dependently controlled pressure regulating valve 62, via a boring 59 in the sleeve 25, and via a longitudinal groove 60 in the bearing axle 7. The temperature controlled pressure regulating valve 62 is constructed as a flat seated valve having a membrane 63 which comprises its movable valve component, which membrane 63 cooperates with an extension of the bearing axle 7 comprising the fixed valve seat 64 in the valve chamber 61, wherein the fuel pressure prevalent downstream of the auxiliary fuel valve 52 prevails, and wherein a pressure spring 65 is located, which acts against the membrane 63, impelling it toward the opened direction of the pressure regulating valve 62. The membrane 63 is impelled toward the closed direction of the pressure regulating valve 62 by means of a bimetallic spring 66, the bimetallic spring 66 being designed in such a manner that its closing force against the membrane is very slight during the warm-up phase at, for example, −20° C. starting temperature of the combustion engine, so that a large auxiliary fuel quantity apportioned at the auxiliary fuel valve 52 can flow to the injection jet 34 via the pressure regulating valve 62, whereas the closing force of the bimetallic spring 66 against the membrane 63 increases with rising operational temperature, thereby decreasing the auxiliary fuel quantity until, subsequent to the completion of the warm-up phase of the combustion engine, the pressure regulating valve 62 is completely closed by the force of the bimetallic spring 66 acting through the membrane 63. The auxiliary fuel quantity flowing past the fixed valve seat 64 of the pressure requlating valve 62 reaches the annular groove 32 of the bearing axle 7 via an axial boring 67 in the bearing axle 7, and via a radial boring 68, from which annular groove 32 the fuel is injected, together with the fuel quantity apportioned at the apportioning valve 29, during the warm-up phase of the internal combustion engine, through the injection jet 34 into the gap 35 between the face of the measuring element 3 and the opposing wall of the air suction line 2.

The method of operation of the fuel injection mechanism is as follows: When the internal combustion engine is running, fuel is sucked from the fuel container 15 by the fuel pump 14 driven by the electric motor 13, and is delivered to the apportioning valve 29 via the line 16. The internal combustion engine simultaneously aspirates air via the air suction line 1, by means of which aspirated air a certain deflection from the position at rest is imparted to the measuring element 3. Corresponding to the given deflection of the measuring element 3, the control slit 26 opens more or less, with respect to the control edge 28. The direct control of the apportioning valve by means of the measuring element 3 yields a constant relationship between the aspirated air and the apportioned fuel quantity. The apportionment takes place at a pressure differential held constant, at any given time, by the differential pressure valve 18, wherein the spring force of the spring 40, and therewith the desired pressure differential, is variable in order to accommodate the various operational conditions of the internal combustion engine. The injection of the apportioned fuel takes place via the injection jet 34 at the face of the measuring element 3 in the gap 35 between the face of the measuring element 3 and the opposing wall of the section 2, i.e., at the site of the highest flow velocity, in order to attain the most homogeneous fuel-air mixture possible. The contour of the wall of the section 2 lying opposite the path of the face of the measuring element 3 can be fitted to the given desired fuel-air relationship.

According to the invention, an auxiliary fuel quantity is apportioned during the warm-up phase of the combustion engine for the enrichment of the fuel-air mixture at the auxiliary fuel valve 52 likewise located within the bearing axle, in accordance with the given attitude of the measuring element 3, which apportioned auxiliary fuel quantity is injected into the air suction line through the injection jet 34 together with the fuel quantity apportioned at the apportioning valve 29, via the temperature dependently controlled pressure regulating valve 62 disposed downstream of the apportioning valve 29. Further, the present construction offers the advantage of obviating a rise of the system pressure within the fuel injection mechanism, for the warmup phase enrichment. Moreover, the incorporation inside the bearing axle 7 of the apportioning valve 29 and of the auxiliary fuel valve 52 yields a compact design of the fuel injection mechanism, thus, short fuel lines are possible and a very good conditioning of the mixture are obtained as a result of the fact that the injection occurs via the face of the measuring element 3.

What is claimed is:

1. A fuel injection mechanism for mixture compressing, externally ignited internal combustion engines for mounting within the air suction tube of the engine, comprising:
    a bearing axle;
    an air measuring element mounted within the air suction tube by the bearing axle;
    restoring force means connected to the air measuring element and the air suction tube for applying a restoring force to the air measuring element in response to displacements of the air measuring element by the air quantity flow through the air suction tube;
    a fuel quantity apportionment valve having a movable component which is movable with the air measuring element for apportionment of a fuel quantity proportional to the air quantity flow through the air suction tube;
    an auxiliary fuel valve having a movable component which is movable with the air measuring element for apportionment of an auxiliary fuel quantity proportional to the air quantity flow through the air suction tube;
    fuel injection means operatively associated with the air measuring element for injecting fuel into the air suction tube;
    a temperature dependently controlled pressure regulating valve connecting to the auxiliary fuel valve downstream thereof in the direction of flow of the auxiliary fuel from the auxiliary fuel valve and operative during engine warm-up to control the auxiliary fuel flow from the auxiliary fuel valve for delivery to the fuel injection means, said fuel injection means receiving and injecting the fuel apportioned by the fuel quantity apportionment valve and the auxiliary fuel valve.

2. The fuel injection mechanism as defined in claim 1, wherein the air measuring element includes a sleeve concentrically mounted relative to the bearing axle, said sleeve being rotatable relative to the bearing axle by the air quantity flow through the air suction tube, and wherein the auxiliary fuel valve comprises:
    a control edge of the bearing axle and a control slit formed in said sleeve.

3. The fuel injection mechanism as defined in claim 1, wherein the temperature dependently controlled pressure regulating valve comprises:
    means defining a valve chamber in which the pressure downstream of the auxiliary fuel valve prevails;
    means defining a fixed valve seat within the valve chamber;
    a membrane forming part of the valve chamber defining means and serving as a movable valve element engageable with the fixed valve seat;
    a pressure spring mounted within the valve chamber for biasing the membrane away from the valve seat; and
    a bimetallic temperature responsive spring for biasing the membrane toward the valve seat.

4. The fuel injection mechanism as defined in claim 3, wherein the membrane engages the valve seat against the biasing force of the pressure spring and under the influence of the biasing force exerted by the bimetallic temperature response spring subsequent to completion of the warm-up phase of the engine operation.

* * * * *